(No Model.)
W. A. ALLEN.
HARNESS.
No. 566,437. Patented Aug. 25, 1896.
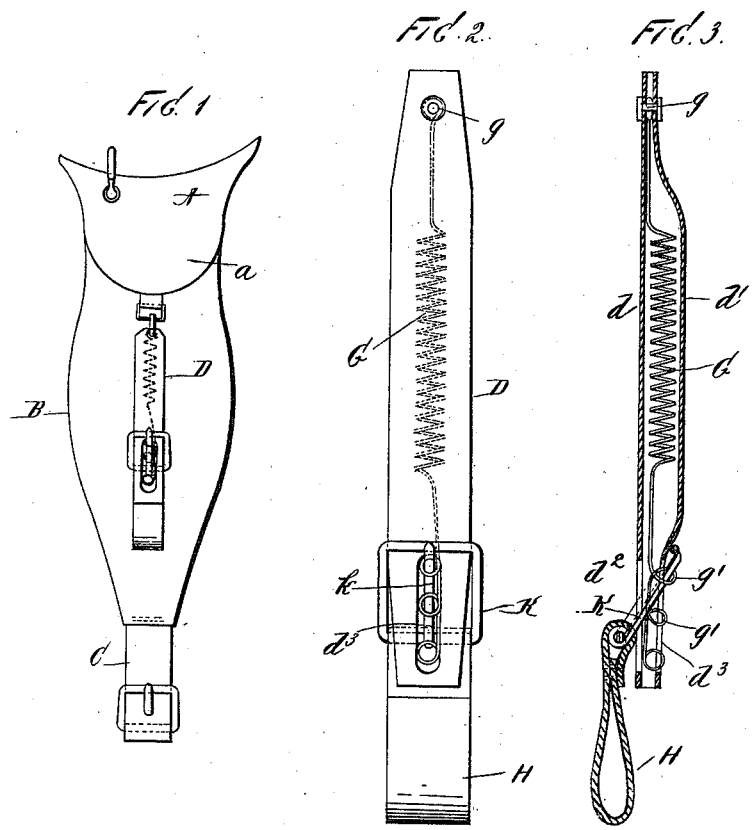
WITNESSES:
INVENTOR
William A. Allen
BY
Edgar Tate
ATTORNEYS

UNITED STATES PATENT OFFICE.

WILLIAM A. ALLEN, OF MANHASSET, NEW YORK.

HARNESS.

SPECIFICATION forming part of Letters Patent No. 566,437, dated August 25, 1896.

Application filed November 7, 1895. Serial No. 568,210. (No model.)

*To all whom it may concern:*

Be it known that I, WILLIAM A. ALLEN, a citizen of the United States, and a resident of Manhasset, in the county of Queens and State of New York, have invented certain new and useful Improvements in Harness, of which the following is a specification, reference being had to the accompanying drawings, forming a part thereof, in which similar letters of reference indicate corresponding parts.

This invention relates to harness for vehicles, and the object thereof is to provide elastic side straps for supporting the shafts of carts and wagons and other vehicles, said straps being adapted to be connected with the saddle of the harness, and to take the jar or strain off of the back of the horse, a further object being to provide supporting-straps of this class in which are located spiral springs which are connected with the loops through which the shafts of a vehicle are passed.

The invention is fully disclosed in the following specification, of which the accompanying drawings form a part, in which—

Figure 1 is a side view of the ordinary harness-saddle with which my improved shaft-supports are connected; Fig. 2, a side view of one of said supports, and Fig. 3 a longitudinal section thereof.

In the accompanying drawings, A represents the usual harness-saddle, and connected therewith at each side thereof are the usual bands B, which are adapted to be connected at the lower ends by means of the usual straps and buckles C; and in the practice of my invention I secure to the sides of the saddle A, and beneath the flaps $a$ thereof, my improved shaft and supporting-straps D. The straps D are composed of two parts $d$ and $d'$, which are stitched together at their edges, or said straps may be composed of a single piece which is folded and the edges thereof stitched together, and within these straps is placed a spiral spring G, one end of which extends upwardly and is secured to a pin $g$, which extends through the upper end of the strap, and by means of which the strap may be connected with the saddle, and the lower end of said spring is provided with a loop or loops $g'$, and the front and back portions of the strap are provided near the lower end with longitudinal slots $d^2$ and $d^3$, respectively, and in practice I provide loops H, through which the shafts are adapted to be passed, one being arranged on each side of the saddle, as will be readily understood, and connected with the upper ends of these loops are buckles K, and the lower ends of the straps D are passed through these buckles and the tongue $k$ of the buckle is passed through the slots $d^2$ and $d^3$ and through one of the loops $g'$ in the lower end of the spring G. It will thus be seen that I provide a yielding support for the shaft, and my invention is not limited to the means for connecting the loops H with the straps D, or with the springs G, located therein, as herein shown and described; and I therefore reserve the right to make all such alterations in, and modifications of, the construction herein shown and described as fairly come within the scope of my invention. It will be understood that the straps B are preferably composed of leather, or other material may be employed, if preferred.

Having fully described my invention, I claim and desire to secure by Letters Patent—

1. The combination with a harness-saddle, of the side strap or tug for the shaft of the vehicle, having a central space formed therein, and slotted back and front at the lower end thereof, the spiral spring located in said central space one end of which is securely fastened to the upper end of the side strap or tug, the lower end connected to a buckle carrying the loop for the shaft, the tongue of which is adapted to slide in the slots of the tug, substantially as described.

2. The combination with a harness-saddle, of side straps or supports for the vehicle, said supports being provided with a central space in which is located a spiral spring, one end of which is secured to the upper end of the support or strap and the lower end of which is provided with loops or eyes, the lower end of said strap being also provided with slots in the front and back thereof, and loops through which the shafts of a vehicle are adapted to be passed, said loop being connected with said straps or supports by means of a buckle through which the lower ends thereof are passed, and the tongue of the buckle being passed through the slots therein and through one of the eyes or loops in the lower end of the spring, substantially as shown and described.

3. The combination with a harness-saddle, of side straps or supports for the shafts of a vehicle, said supports being provided with a central space in which is located a spiral spring, one end of which is secured to the upper end of the support or strap, and the lower end of which is provided with loops or eyes, the lower end of said straps being also provided with slots in the front and back thereof, and loops through which the shafts of a vehicle are adapted to be passed, said loops being connected with said straps or supports by means of a buckle through which the lower ends thereof are passed, and the tongue of the buckle being passed through the slots therein and through one of the eyes or loops in the lower end of the spring, substantially as shown and described.

4. The combination with a harness-saddle, the hollow side strap or tug, for supporting the shaft of the vehicle slitted back and front at their lower ends, the spiral spring centrally located within the hollow space of the side strap or tug, securely fastened at one end, to the upper end of the strap or tug, the buckle connected to the opposite end of the said spiral spring, and adapted to slide in the slots in the side strap or tug, the eye or loop for the shaft fastened to the buckle, substantially as described.

In testimony that I claim the foregoing as my invention I have signed my name, in presence of the subscribing witnesses, this 4th day of November, 1895.

WILLIAM A. ALLEN.

Witnesses:
CHARLES H. WEBB,
D. B. ALLEN.